United States Patent [19]
Goddard

[11] Patent Number: 5,715,743
[45] Date of Patent: Feb. 10, 1998

[54] FOODSTUFF COOKING AND STORAGE SYSTEM

[76] Inventor: Ronald J. Goddard, 815 E. Oakton, Des Plaines, Ill. 60018

[21] Appl. No.: 635,608

[22] Filed: Apr. 22, 1996

[51] Int. Cl.⁶ ............... A47J 27/00; A47J 27/04; A47J 36/00; B65D 45/00

[52] U.S. Cl. ............... 99/403; 99/340; 99/410; 126/369; 220/231; 220/318; 220/912

[58] Field of Search ............... 99/403, 410–413, 99/339, 340, 472, 352–355; 206/545, 546; 220/367.1, 428, 627, 203.09, 203.22, 298, 318, 212.5, 756, 766, 772, 912, 759, 231, 412; 422/26; 426/402, 403, 407; 126/369, 378, 381

[56] References Cited

U.S. PATENT DOCUMENTS

| | | | |
|---|---|---|---|
| 2,682,390 | 6/1954 | Pollard | 99/355 |
| 4,090,310 | 5/1978 | Koff | 99/511 X |
| 4,932,550 | 6/1990 | Moucha | 99/403 X |
| 5,320,028 | 6/1994 | Grunberg | 99/340 |
| 5,347,918 | 9/1994 | Chen | 99/472 |
| 5,355,777 | 10/1994 | Chen et al. | 99/340 |
| 5,373,608 | 12/1994 | Welch | 99/403 X |

*Primary Examiner*—Timothy F. Simone

[57] ABSTRACT

An improved foodstuff cooking and storage system including containers having resilient seals at their top lips that connect with either a cooking lid or a storage lid. The cooking lid is adapted to increase pressure in the containers to enhance cooking, and the storage lid is adapted to create a vacuum in the containers as they cool to enhance foodstuff freshness.

10 Claims, 2 Drawing Sheets

FOODSTUFF COOKING AND STORAGE SYSTEM

BACKGROUND OF THE INVENTION

Foodstuff cooking and storage systems in the past have generally been categorized in one of two basic systems; the first being essentially a canning-type system utilizing a plurality of sealed containers principally the "Ball" type into which cooked foodstuff is poured or positioned prior to cooling and then immediately lidded with sealing lids in preparation for storage. The second system is essentially a double container system in which a cooking or storage container is placed within a pressurized vessel during cooking and then removed after cooking for storage.

The following patents exemplify this general state of the art:

McIntire, U.S. Pat. No. 420,917, Issued: Feb. 4, 1890; Perrote, U.S. Pat. No. 603,857, Issued: May 10, 1898; Humphrey, U.S. Pat. No. 1,666,012, Issued: Apr. 10, 1928; Pollard, U.S. Pat. No. 2,682,390, Issued: Jun. 29, 1954; Peyser, et al., U.S. Pat. No. 3,641,992, Issued: Feb. 15, 1972; Koff, U.S. Pat. No. 4,090,310, Issued: May 23, 1978; Beauvais, et al., U.S. Pat. No. 4,332,826, Issued: Jun. 1, 1982; Moucha, U.S. Pat. No. 4,932,550, Issued: Jun. 12, 1990; Grunberg, U.S. Pat. No. 5,320,028, Issued: Jun. 14, 1994; Chen, U.S. Pat. No. 5,347,918, Issued: Sep. 20, 1994; Chen, et al., U.S. Pat. No. 5,355,777, Issued: Oct. 18, 1994; Welch, U.S. Pat. No. 5,373,608, Issued: Dec. 20, 1994; Stockli, Swiss Patent No. CH 678,800-A, Nov. 15, 1991.

The Chen, U.S. Pat. No. 5,347,918, discloses a cooking pot 3 that after cooking is placed into an outer larger pot and evacuated by a pump system. The purpose of this system is quite different than the present invention in that its objective is to maintain the heat in the inner pot for a longer period.

The Chen, U.S. Pat. No. 5,355,777, works in a similar manner without any evacuation system.

The Swedish Patent No. 678,800-A does disclose the concept of utilizing a rubber seal 7 to create a pressure cooking system controlled by slots 10, 11, 36, 37, 38, 41, etc. for the purpose of partly relieving pressure within the container.

The McIntire, U.S. Pat. No. 420,917, the Perrote, U.S. Pat. No. 603,857, and the Welch, U.S. Pat. No. 5,373,608 all disclose cooking pots with removable handles.

The Humphrey, U.S. Pat. No. 1,666,012, discloses a double container cooking pot with a release valve as shown in FIG. 3.

The Moucha, U.S. Pat. No. 4,932,550, shows a pressure cooker with a bayonet-type connector.

The Peyser, et al., U.S. Pat. No. 3,641,992, discloses a double boiler heating container that permits pressure to be relieved within the outer volume by a plurality of restrictive apertures 28, 30 and 33.

The Bouvas, et al., U.S. Pat. No. 4,332,826, discloses a canning system involving a gasket 46 on the container 6 that can be reheated to release the vacuum using a vent tab 52 as described in the bottom of Column 5 and the top of Column 6 in the patent.

It is a primary object of the present invention to ameliorate the problems noted above and described in the prior art and to provide an improved foodstuff cooking and storage system.

SUMMARY OF THE PRESENT INVENTION

In accordance with the present invention, an improved foodstuff cooking and storage system is provided that includes a plurality of containers having resilient seals at their tops engageable selectively with either a cooking lid or a storage lid. The cooking lid is designed to increase pressure in the containers to enhance cooking efficiency, and the storage lid is adapted to create a vacuum in the containers as they cool to enhance foodstuff freshness.

Toward these ends, the cooking lid has a plurality of vertical slots spaced peripherally around a lower lip that is engageable with the seal on the containers. By adjusting these cooking lids vertically slightly on the container seals, the orifice defined by the slots and the seals can be varied to control pressure within the containers during cooking, and hence, achieve variable pressure cooking in a very economical manner.

The storage lids have check valves in their top surfaces that permit the vacuum created within the containers to be released when it is desired to remove the storage lids after storage in preparation for foodstuff removal.

In use, the cooking lid is utilized during cooking and is replaced by the storage lid before the container and foodstuff have cooled. The storage lids have an air-tight seal with the resilient seals at the top of the containers so that a vacuum is created within the containers as the containers cool down. It is this vacuum that is released by the manual manipulation of the storage lids check valves when one desires to utilize the contents of the container.

In a single storage system, there is provided a plurality of containers, a single cooking lid, a plurality of storage lids, usually equal in number to the number of containers, and a single removable handle assembly. This combination enables the containers to be stacked for shipment and storage and the single handle assembly and single cooking lid are useable with all of the storage containers and provide a lower cost system.

DETAILED DESCRIPTION OF THE PREFERRED EMBODIMENT

Figure 1:
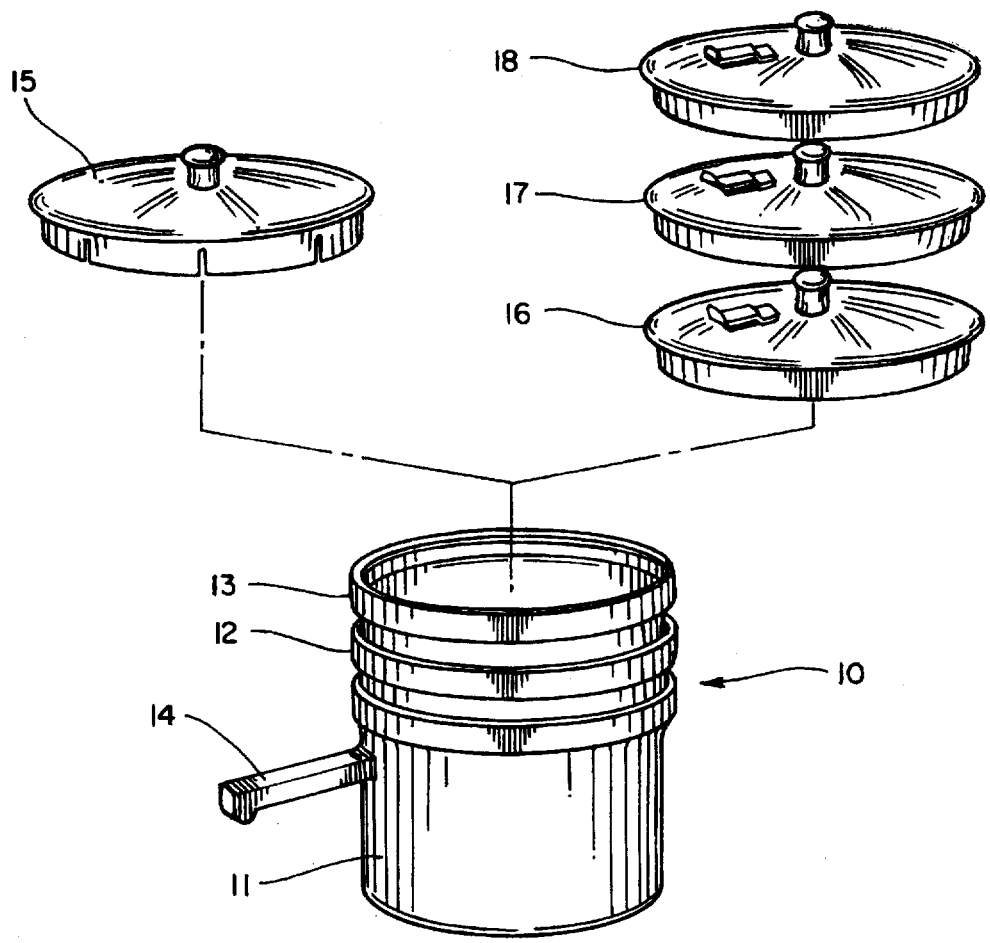
FIG. 1 is a perspective view of the stacked containers, a single cooking lid, and a plurality of storage lids according to the present invention.

Referring to the drawings and particularly FIG. 1, the present cooking and storage system 10 is illustrated including a plurality of pots or containers 11, 12, 13, a universal single handle assembly 14, a cooking lid 15, and a plurality of storage lids 16, 17 and 18.

It should be understood that while there are three containers 11, 12 and 13 and three storage lids 16, 17 and 18, that any number could be provided. There is, however, a single cooking lid 15 in each cooking system 10 and, of course, a single handle assembly 14, both for the purpose of reducing the cost of the system. It should be understood, however, that one or more additional cooking lids could be provided to permit cooking in several containers at the same time.

Figure 2:
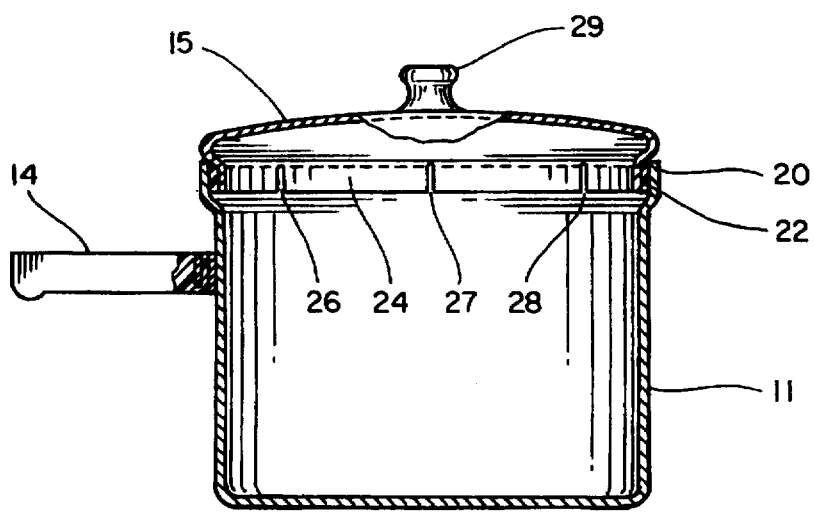
FIG. 2 is a longitudinal section of one of the containers with the handle assembled and a cooking lid engaged therewith.

As seen in FIG. 2, each container has an enlarged upper cylindrical lip portion 20 having an elastomeric seal 22 bonded to its inner surface for the purpose of creating a seal with either the cooking lid assembly 15 or the storage lid assemblies 16, 17 and 18.

As seen in FIGS. 1 and 2, the cooking lid has a downwardly depending annular lip portion 24 that seats against the seal 22. Lip portion 24 has a plurality of vertical slots 26, 27 and 28 therein that are partly closed and sealed by the seal 22. During cooking, the cook vertically adjusts the lid assembly with respect to the seal 22 by manipulating lid knob 29, to vary the opening of the slots 26, 27 and 28 to the atmosphere to control pressure within the containers 11, 12, and 13 during cooking to in effect create a variable pressure cooker within the containers.

Figures 5, 6:
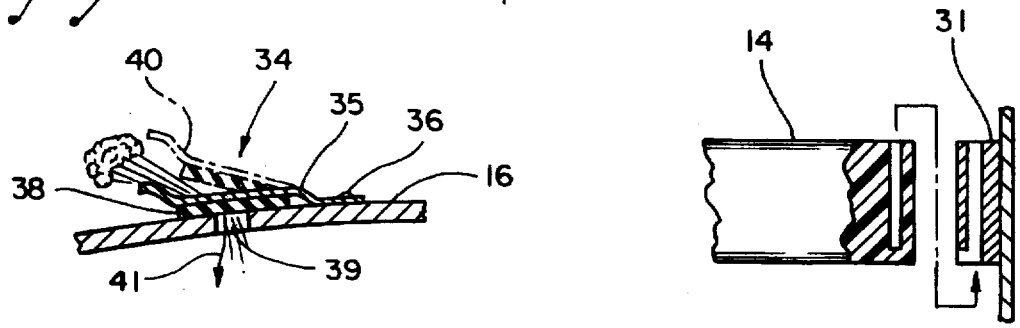
FIG. 5 is an enlarged section through the check valve illustrated in FIG. 3.
FIG. 6 is an enlarged fragmentary section illustrating a portion of the handle assembly exploded from the container as illustrated in FIG. 3.

As seen in FIGS. 1, 2, and 6, the handle assembly is removably attached to each container utilizing a bracket 31 welded to the side of each of the containers which are typically constructed of steel or stainless steel. While not clearly illustrated in the drawings, the brackets 31 are near the top portions of the containers so that they do not significantly interfere with stacking in the containers as illustrated in FIG. 1.

Figure 3:
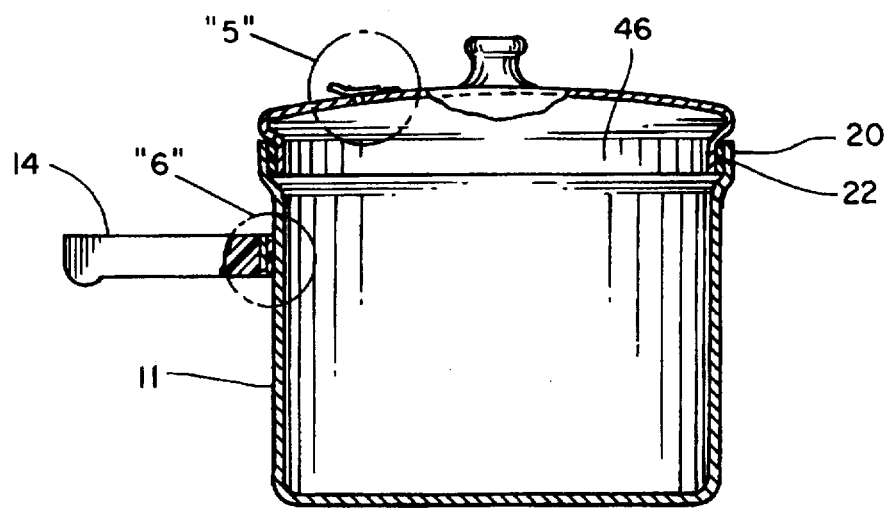
FIG. 3 is a longitudinal section similar to FIG. 2 with one of the storage lids in place.
Figure 4:
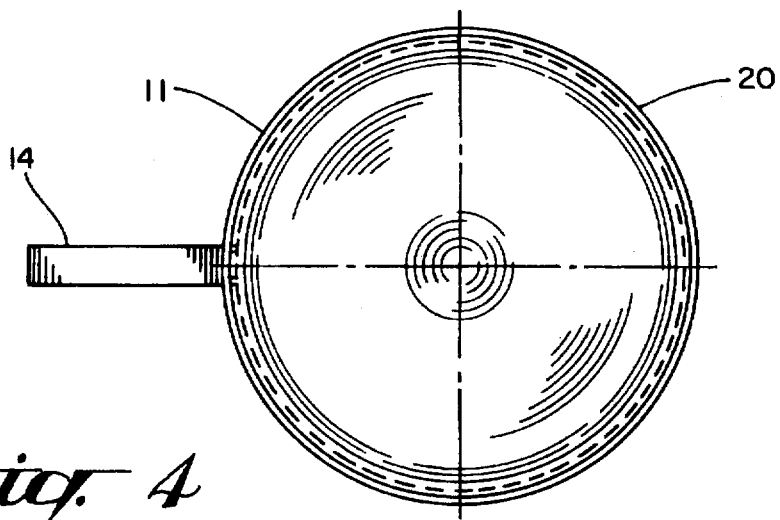
FIG. 4 is a bottom view of the handle lid and container assembly illustrated in FIG. 3.

As seen in FIGS. 1, 3 and 5, each of the storage containers has a check valve assembly 34 in its upper surface including a spring steel base 35 welded at 36 to the upper surface of the lid to which is bonded an elastomeric seal 38 that selectively seals an aperture 39 in lid. The base 35 has an upwardly stepped end portion 40 that the user's finger lifts to raise the seal 38 and permit air to enter in the direction of arrow 41 in the container breaking the vacuum therein after storage.

In use, the handle assembly is attached to one of the containers 11, 12, 13, the foodstuff placed in the container, and the container lidded by lid assembly 15. As described above, lid assembly 15 can be variably positioned to adjust the pressure in the container during cooking to achieve the desired level of pressure cooking enhancement during this phase of the cooking and storage system.

After cooking, the cooking lid 15 is removed and replaced by one of the storage lids 16, 17 and 18 before the container and the foodstuff contents have cooled. As the container and foodstuff contents cool, a vacuum is created within the container that continues during storage to enhance the freshness of the foodstuff within the container. Refrigeration of these evacuated containers is not necessary. In this regard it should be understood that the storage lids, as seen in FIG. 3, have depending annular lower lip 46 that engages the seal 22 to provide an airtight seal within the container during both cooling and storage.

After cooking, the cooking lid is removed by lifting the tab 40, releasing the vacuum in the container. If it is desired that the foodstuff be reheated after storage, this can be effected either with the cooking lid 15 or the storage lid 15, 16, 17 and 18. If with the storage lid, the vacuum created in the container is reduced simply by the elevation of temperature within the container and any over-pressure condition is prevented by air escaping through check valve 34. Alternatively, the contents can be reheated utilizing the cooking lid 15, which can if desired, be utilized in a pressure cooking mode.

I claim:

1. A foodstuff cooking and storage system, comprising: a container for both cooking and storing foodstuffs, lid means for the container useable both in cooking and storing the foodstuffs in the container, seal means between the lid means and the container means for creating a pressure in the container during cooking to enhance cooking, and storage means in the lid means for creating a vacuum in the container as the container and lid means cools after cooking to enhance foodstuff freshness and for maintaining that vacuum during storage, said storage means including a releasable seal in the lid means.

2. A foodstuff cooking and storage system as defined in claim 1, wherein the lid means includes a first lid useable for cooking and a second lid useable in storage.

3. A foodstuff cooking and storage system as defined in claim 2, wherein the first lid includes variable vent means to control pressure in the container during cooking.

4. A foodstuff cooking and storage system as defined in claim 2, wherein the releasable seal includes check valve means for releasing the vacuum in the container after storage.

5. A foodstuff cooking and storage system, comprising: a plurality of containers for cooking and storing foodstuff, each of the containers having an upper lip portion having a resilient seal on an inside surface thereof, a cooking lid engageable with one of the containers and the resilient seal thereof during cooking for increasing the pressure in the container to enhance cooking efficiency, and a storage lid engageable with the container and the resilient seal thereof after cooking but before cooling for creating a vacuum in the container as the container cools to enhance foodstuff freshness during storage.

6. A foodstuff cooking and storage system as defined in claim 5, wherein the cooking lid includes variable vent means to control pressure in the container during cooking.

7. A foodstuff cooking and storage system as defined in claim 6, wherein the variable vent means includes a plurality of slots in a lip of the cooking lid, said lip being engageable with the resilient seal in the container in a plurality of positions to vary the orifice defined by the slots and the resilient seal.

8. A foodstuff cooking and storage system as defined in claim 5, wherein the storage lid includes a check valve for releasing the vacuum in the container after storage to permit removal of the storage lid.

9. A foodstuff cooking and storage system, comprising: a plurality of containers for cooking and storing foodstuff, each of the containers having an upper lip portion having a resilient seal on an inside surface thereof, a cooking lid engageable with one of the containers and the resilient seal thereof during cooking for increasing the pressure in the container to enhance cooking efficiency, and a storage lid engageable with the container and the resilient seal thereof after cooking but before cooling for creating a vacuum in the container as the container cools to enhance foodstuff freshness during storage, the cooking lid having variable vent means to control pressure in the container during cooking, and the storage lid having a check valve for releasing the vacuum in the container after storage to permit removal of the storage lid.

10. A foodstuff cooking and storage system, comprising: a plurality of containers for cooking and storing foodstuff, each of the containers having an upper lip portion having a resilient seal on an inside surface thereof, a cooking lid engageable with one of the containers and the resilient seal thereof during cooking for increasing the pressure in the container to enhance cooking efficiency, and a storage lid engageable with the container and the resilient seal thereof after cooking but before cooling for creating a vacuum in the container as the container cools to enhance foodstuff freshness during storage, the cooking lid having variable vent means to control pressure in the container during cooking, the variable vent means including a plurality of slots in a lip of the cooking lid, said lip being engageable with the resilient seal in the container in a plurality of positions to vary the orifice defined by the slots and the resilient seal and the storage lid including a check valve for releasing the vacuum in the container after storage to permit removal of the storage lid.

* * * * *